United States Patent [19]

Steere, Jr.

[11] Patent Number: 5,148,797
[45] Date of Patent: Sep. 22, 1992

[54] MOUNTING FOR AN INTERNAL DIAMETER SAW BLADE

[75] Inventor: Robert E. Steere, Jr., Boonton, N.J.

[73] Assignee: Silicon Technology Corporation, Oakland, N.J.

[21] Appl. No.: 669,034

[22] Filed: Mar. 14, 1991

[51] Int. Cl.⁵ .......................... B24B 7/20; B28D 5/00
[52] U.S. Cl. ......................... 125/13.02; 51/166 TS; 51/73 R
[58] Field of Search ............. 51/73 R, 166 TS, 166 R; 125/13.02, 14, 13.01, 13.03; 83/915.5, 485, 483, 647.5

[56] References Cited

U.S. PATENT DOCUMENTS

| | | | |
|---|---|---|---|
| 4,420,909 | 12/1983 | Steere, Jr. | 51/73 R |
| 4,974,578 | 12/1990 | Charles et al. | 51/73 R |

*Primary Examiner*—Roscoe V. Parker, Jr.
*Attorney, Agent, or Firm*—Francis C. Hand

[57] ABSTRACT

The spindle on which the wheelhead rotates is mounted within a spindle housing which, in turn, is mounted by a bearing at one end in a pivotally mounted housing. A pair of hydraulic cylinders engage the opposite end of the spindle housing and are actuated during a cutting stroke so as to impose a force on the spindle housing to effect a lateral displacement of the spindle housing in a plane common to the spindle axis and the pivot axis of the housing. The lateral deflection, in turn, causes a lateral deflection of the wheelhead thereby controlling the lateral deviation of the wheelhead relative to the true cutting plane during the cutting stroke. A sensor is provided between the housing and the wheelhead to sense and control deviations of the wheelhead from the true cutting plane. The arrangement may also be used for saws with wheelheads which are horizontally mounted for the cutting of vertically mounted ingots.

23 Claims, 3 Drawing Sheets

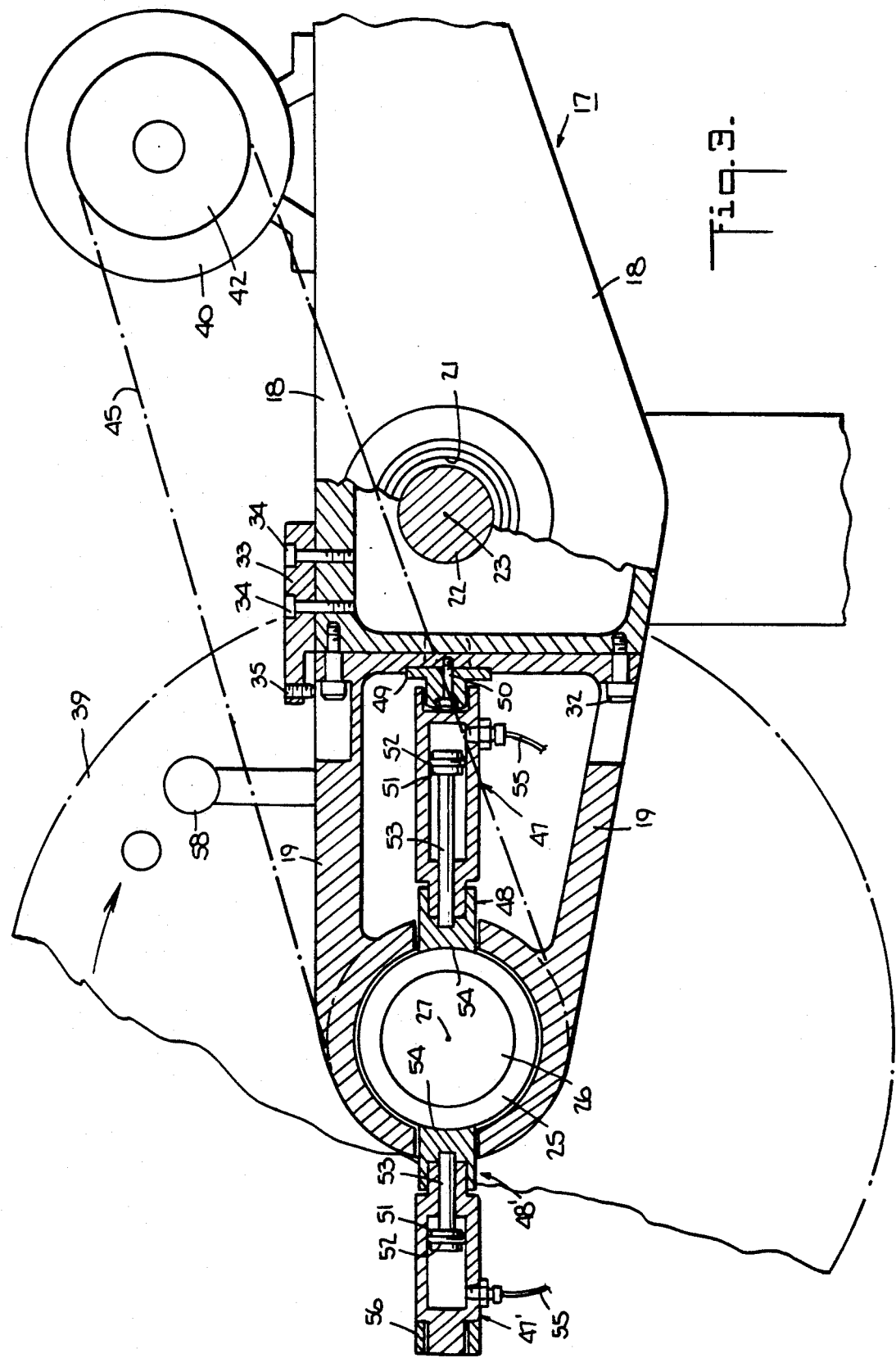

MOUNTING FOR AN INTERNAL DIAMETER SAW BLADE

This invention relates to a mounting for an internal diameter saw blade. More particularly, this invention relates to a mounting for an internal diameter saw blade capable of compensating for inherent lateral wheelhead deviation.

As is known, wafering machines have been constructed in various manners so that a wafer may be sliced from a crystal ingot by means of an internal diameter saw blade with either the saw blade moving relative to the ingot or the ingot moving relative to the saw blade. In some cases, such as described in U.S. Pat. No. 4,420,909, the saw blade has been mounted in a manner to move with a pivotal cutting motion generally perpendicular to the axis of the ingot during a slicing operation. In these cases, it has also been known to have the saw blade mounted via a wheelhead in a cantilevered manner on a rotatable spindle which, in turn, is rotatably mounted in a housing which can be pivoted about a fixed axis generally parallel to the axis of the ingot. Further, in order to compensate or the deflection of the spindle due to the weight of the wheelhead and saw blade, as described in U.S. Pat. No. 4,974,578 the housing has been divided into two parts with one part being mounted about a fixed pivot axis and the second part rotatably receiving the spindle on which the saw blade is mounted. In addition, the two housing parts have been pivotally mounted relative to each other so as to permit pivoting on an axis perpendicular to the fixed axis as well as the axis of the spindle. This allows the repositioning of the spindle relative to the fixed pivot axis in order to compensate for a deviation of the saw blade from a true perpendicular relationship relative to the axis of the pivotal cutting motion and, thus, the axis of the crystal ingot. That is to say, the split housing allows compensation for deflection of the spindle due to the weight of the wheelhead which carries the saw blade. However, this also inherently introduces a small component of lateral deviation of the wheelhead. This can be more readily visualized by picturing the pivot arm of the housing turned a full 90° up or down. In either of these positions, the angular tilt of the split housing is no longer compensating for deflection of the wheelhead but is shifting the axis of the spindle laterally.

Accordingly, it is an object of the invention to correct for and eliminate small lateral deviations in an internal diameter saw blade during a normal cutting stroke.

It is another object of the invention to compensate for inherent lateral wheelhead deviation in a relatively simple manner.

It is another object of the invention to provide a relatively simple mounting for an internal diameter saw blade for the slicing of wafers from crystal ingots.

Briefly, the invention provides a mounting for an internal diameter saw blade which comprises a pivot housing for pivoting about a first fixed pivot axis and a spindle which is received in a bore of the pivot housing with the spindle on a second axis parallel to the first axis. In addition, the spindle has a free end on one side of the housing for mounting of a wheelhead for an internal diameter saw blade thereon. Still further, the mounting includes means for imposing a force on the spindle perpendicular to the axis of the spindle in order to deflect the free end of the spindle and, thus the wheelhead laterally of this axis.

In order to facilitate deflection of the wheelhead, the spindle is rotatably mounted in a spindle housing which, in turn, is slidably mounted in a bearing portion of the bore of the pivot housing at a forward end and is fastened via a flange of the spindle housing to the face portion of the pivot housing while the rear end of the spindle housing is received in the pivot housing with a slight clearance.

The means for imposing a force on the spindle includes a cylinder which is fixedly mounted in the pivot housing and a piston which is reciprocably mounted in the cylinder to abut against the spindle housing in order to impose a deflecting force on the spindle housing and, thus, upon the spindle. In this regard, any suitable means may be used for actuating the piston. For example, a hydraulic line may communicate with the cylinder in order to deliver hydraulic fluid to the cylinder in order to bias the piston towards the spindle housing from time-to-time.

Alternatively, a pair of cylinders may be fixedly mounted in the pivot housing on opposite sides of the spindle housing with a pair of pistons each of which is reciprocably mounted for imposing a force on the spindle housing from opposite sides. Thus, one piston may be moved so as to deflect the spindle end in one direction while the other piston is actuated to deflect the spindle end in the opposite direction.

The actuation of the means for deflecting the spindle may be operated in an automatic manner. For example, where a wheelhead is secured to the end of the spindle for the mounting of the internal diameter saw blade thereon, a sensor can be mounted on the pivot housing in facing relation to the wheelhead for sensing the distance of the wheelhead from the sensor and for generating a signal in response to the distance being greater or less than a predetermined value, for example, a value corresponding to a true perpendicular plane relative to the fixed pivot axis of the spindle and, thus, the axis of the ingot which is to be cut. In this case, a closed loop control system is connected to the sensor in order to receive the signal which is generated. In addition, the closed loop control system is connected to the deflecting means in order to activate the spindle deflecting means in response to the signal in order to control movement of the wheelhead relative to the sensor.

In this embodiment, the bearing portion of the bore of the pivot housing serves to maintain the spindle housing centered within the pivot housing. The face portion of the pivot housing serves to maintain the spindle parallel and fixed relative to the first axis pivot. Thus, upon actuation of the deflecting means, a force is imposed upon the cantilevered rear end of the spindle housing and, thus, the spindle, so as to deflect the forward free end of the spindle in an opposite direction. This deflection of the free end of the piston serves to deflect the wheelhead and, thus, the saw blade laterally, that is, in co-planar relation parallel to the deflecting force imposed upon the spindle.

In one embodiment, the internal diameter saw blade can be mounted for pivoting about a horizontal axis while the ingot to be severed is disposed to move into the plane of the saw blade.

In another embodiment, the saw blade may be mounted in a horizontal plane with the ingot mounted on a vertical axis for relative movement between. For example, where a work holder structure overhangs a wheelhead so as to guide an ingot into the saw blade on the wheelhead, the work holder structure may experience a variable deflection. Further, the amount of deflection of the overhanging structure may vary as the weight of the workpiece changes. In such a case, a means for imposing a force on the spindle which supports the wheelhead may be used to deflect the wheelhead relative to the ingot. Alternatively, the means may be used for imposing a force on the work holder structure so as to effect movement of the depending free end of the ingot into a plane parallel to the saw blade.

These and other objects and advantages of the invention will become more apparent from the following detailed description taken in conjunction with the accompanying drawings wherein:

FIG. 3 illustrates a partial front view of the mounting of FIG. 2.

Figure 1:
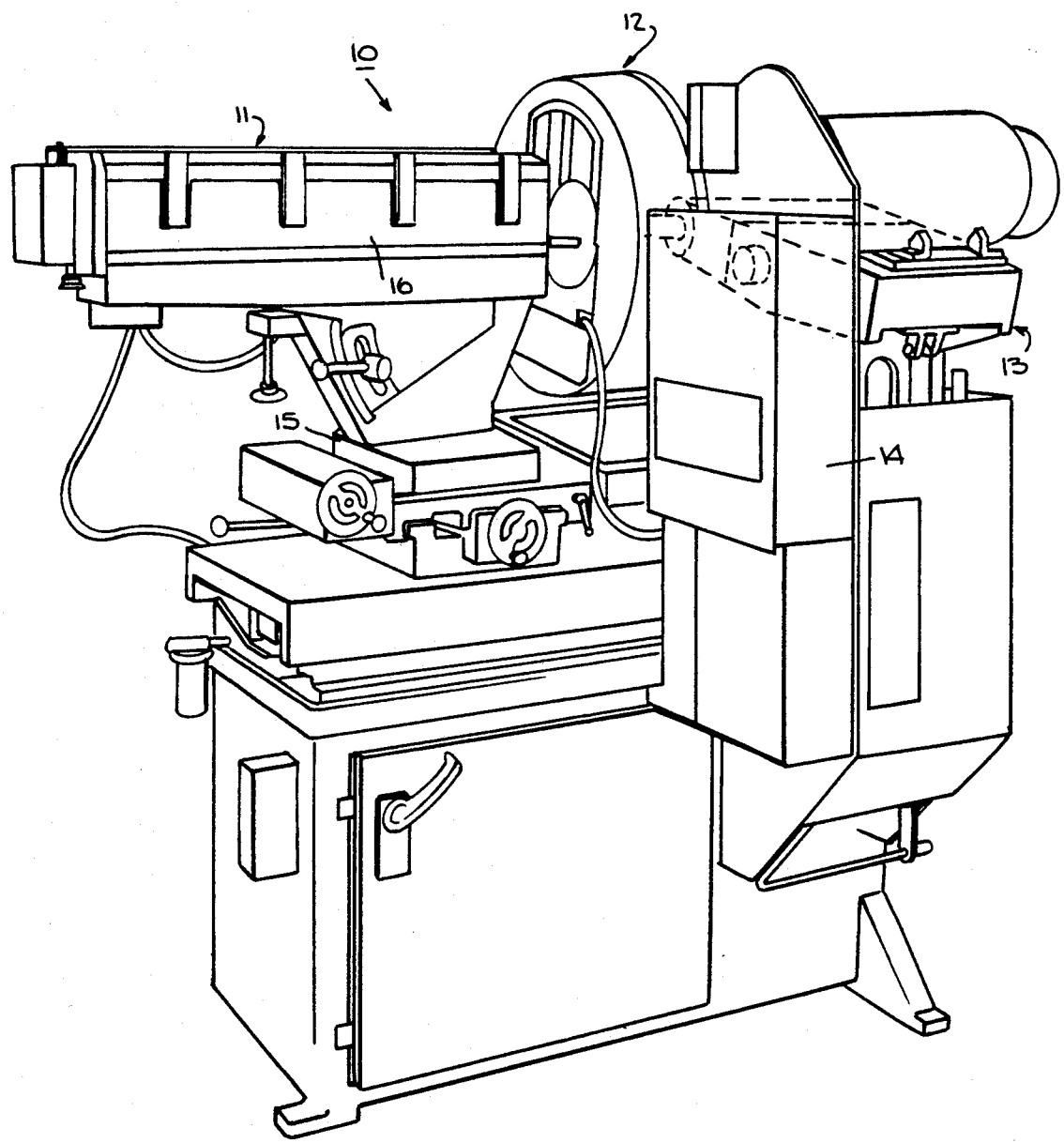
FIG. 1 illustrates a perspective view of a wafering machine employing a mounting for an internal diameter saw blade in accordance with the invention.

Referring to FIG. 1, the wafering machine 10 includes an ingot feed means 11, a cutting head 12, a mounting 13 for the cutting head 12 and a control box 14. The remainder of the wafering machine 10 is of generally conventional structure and need not be further described.

The ingot feed means 11 includes a pedestal 15 mounting an ingot box 16 in an offset manner relative to the cutting head 12. The ingot box 16 is mounted in cantilevered relation to the pedestal 15 and in alignment with the cutting head 12. The ingot box 16 includes a known means for moving and positioning a crystal ingot (not shown) for cutting purposes. The crystal may be of any suitable materials such as silicon and may be of any suitable shape such as a cylindrical shape.

Figure 2:
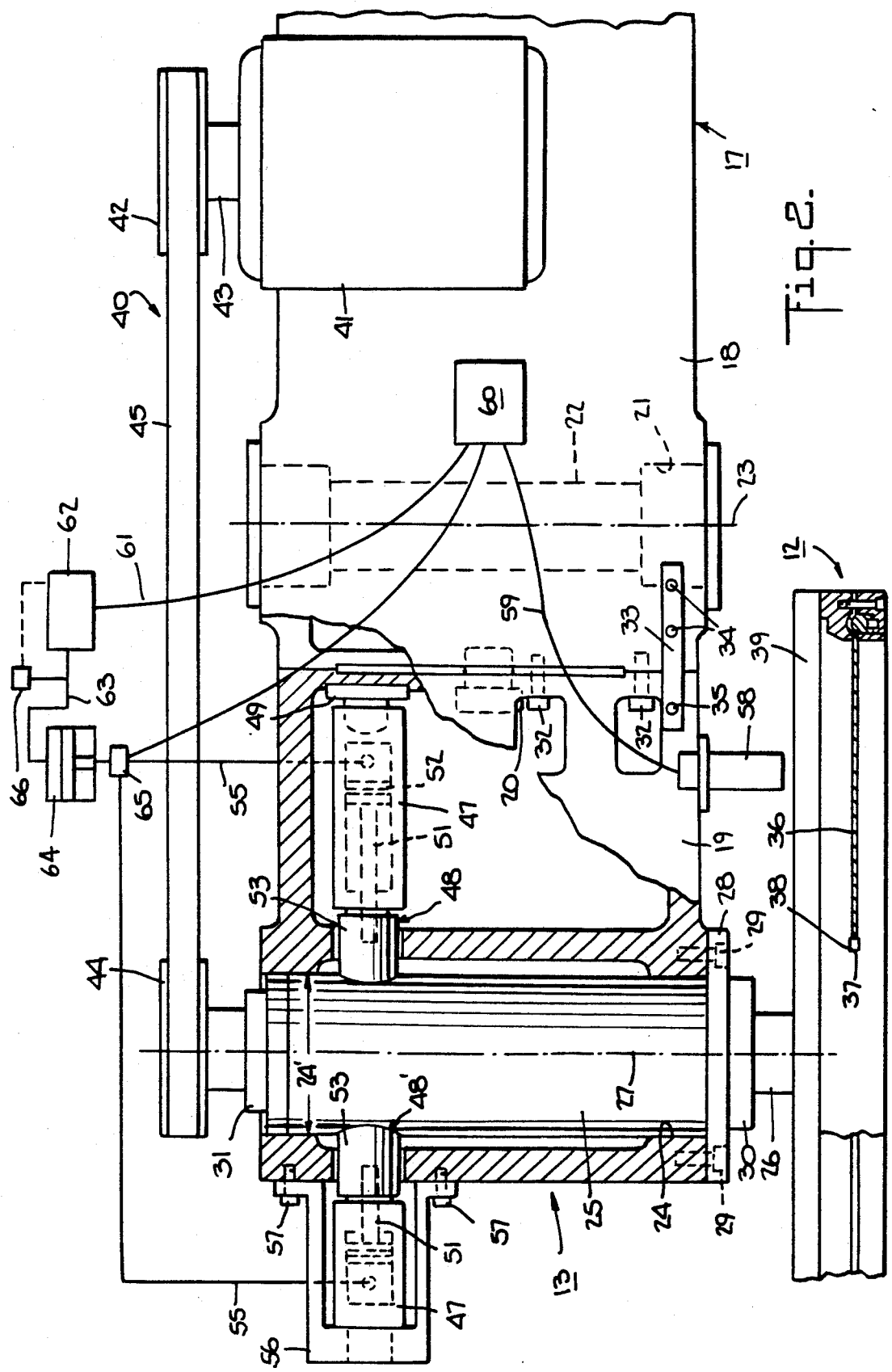
FIG. 2 illustrates a partial cross-sectional view of a mounting for an internal diameter saw blade in accordance with the invention.

Referring to FIG. 2, the mounting 13 for the cutting head 12 includes a housing 17 which is formed of two parts 18, 19 which are pivotally connected to each other via a suitable bushing assembly 20 such as that described in U.S. Pat. No. 4,974,578. One housing part 18 is provided with a bore 21 for mounting on a stationary shaft 22 about a fixed pivot axis 23 in the machine 10. The other housing part 19 has a bearing portion bore 24 and a clearance portion bore 24' for receiving a housing 25 in which a spindle 26 is rotatably mounted by suitable bearings to rotate on a second axis 27 parallel to the pivot axis 23 of the housing 17.

As indicated in FIG. 2, the spindle housing 25 is slidably mounted within the bearing portion bore 24 of the adjustable housing part 19 and has an annular flange 28 fastened to a face of the housing part 19 by a plurality of circumferentially spaced screws 29 so as to maintain the spindle housing 25 in place. A suitable seal collar 30 is also secured to the spindle housing 25 to seal about the spindle 26. At the rear end, the spindle housing 25 is spaced from the clearance portion bore 24' of the housing part 19 a small distance for purposes as explained below. A further seal collar 31 is also disposed between the housing 25 and spindle 26 thereat.

The housing 17 is pivotally mounted about the shaft 22 by suitable means as is known and need not be further described.

The mounting 13 also has locking means in the form of locking screws 32 (see FIG. 2) for releasably securing the adjustable housing part 19 to the fixed housing part 18 in an adjusted position about a pivot axis of the bushing assembly 20.

The mounting 13 also includes adjusting means for pivoting the adjustable housing part 19 relative to the fixed housing part 18. As indicated, the adjusting means includes a pair of adjustment blocks 33 which are mounted on the fixed housing part 18 in overlying relation to the adjustable housing part 19 as well as on opposite sides of the bushing 20. Each block 33 (only one of which is shown) is secured to the fixed housing part 18 by a pair of bolts 34. In addition, an adjusting screw 35 is threadably mounted in each block 33 perpendicularly of the adjustable housing part 19 in order to abut the adjustable housing part 19 for pivoting of this part 19 about the bushing 20.

Referring to FIG. 2, the cutting head 12 is mounted on a free end of the spindle 26 which projects from the front of the adjustable housing part 19. As indicated, the cutting head 12 is of conventional structure and serves as a means to mount a rotary internal diameter saw blade 36 having a bore 37 and an internal cutting edge 38 about the bore. The blade 36 serves to sever wafers from a crystal ingot as is known. Further, the cutting head 12 includes a wheelhead 39 which is fixed secured to the spindle 26 for rotation about the spindle axis 27 and which carries the saw blade 36.

In addition, a drive transmission 40 is connected to the rear end of the spindle 26 for rotation of the spindle 26 about the axis of rotation 27. As indicated, the drive transmission 40 includes a motor 41 which is mounted on the fixed housing part 18, a pulley 42 which is secured to a drive shaft 43 of the motor 41, a pulley 44 which is secured to the spindle 26 and an endless drive belt 45 which passes over both pulleys 42, 44 in order to transmit a drive force to the spindle 26 for rotating the spindle about the axis of rotation 27 and, thus, the saw blade 36 about the axis of rotation 27.

Referring to FIGS. 2 and 3, in order to correct for any lateral deviation at the wheelhead 39, a deflecting means 46 is provided for imposing a force on the spindle housing 25 perpendicular to the axis of rotation 27 in order to deflect the free end of the spindle 26 laterally of the axis of rotation 27.

As indicated, the deflecting means 46 includes a pair of hydraulic cylinders 47, 47' which are fixedly mounted relative to the second housing part 19 on opposite sides of the spindle housing 25 and a pair of pressure shoes 48, 48' which are acted upon by the respective cylinders 47, 47' and which abut against the spindle housing 25 for imposing forces thereon. For example, as shown in FIG. 3, one cylinder 47 which is located within the adjustable housing part 19 has a recessed right end, as viewed, which slidably fits over a mounting block 49 secured by a bolt 50 to the adjustable housing part 19. In addition, a piston 51 is slidably mounted within the cylinder 47 with a piston ring 52 for sliding within a bore of the cylinder 47. A piston rod 53 is connected at one end to the piston 51 and at an opposite end to the pressure shoe 48. As indicated, the pressure shoe 48 has an arcuate front surface 54 for mating against the cylindrical surface of the spindle housing 25. A suitable hydraulic line 55 communicates with the interior of the cylinder 47 so as to deliver hydraulic fluid thereto for example, from a hydraulic fluid reservoir (not shown), for expelling the piston rod 53 from the cylinder 47. Suitable valving may also be provided in the line 55 so as to permit exhaust of hydraulic fluid from the cylinder 48 to the reservoir (not shown) when the piston rod 53 is to be retracted.

The opposed cylinder 47' is constructed in a similar manner but has a rearmost end of cylindrical shape which is slidably mounted in a bracket 56 which projects from and is secured to the exterior of the adjustable housing part 19 by means of screws 57. (see FIG. 2).

Referring to FIGS. 2 and 3, a sensor 58 is mounted on the adjustable housing part 19 in facing relation to the wheelhead 39 for sensing the distance of the wheelhead 39 from the sensor 58 and for generating a signal in response to the distance being greater or less than a predetermined value. The sensor 58 may be of a non-contact type, for example, Displacement Transducer Model 4943 from Electro Corp., Sarasota, Fla. and is located at a point on a line which forms an angle of 45° with the horizontal plane containing the fixed axis 23 and spindle axis 27.

As illustrated in FIG. 2, the sensor 58 is connected via a suitable electrical line 59 to the machine control 60 so as to deliver the generated signal thereto. The control 60 is, in turn, connected via a suitable line 61 to a proportional air pressure controller 62 which receives a flow of compressed air from a suitable source (not shown). The air pressure controller 62 is, in turn, in communication via a line 63 with a fluid pressure intensifier 64. The air pressure is converted and intensified to a higher hydraulic pressure sufficient to deflect the spindle housing over the desired range. A directional valve 65 connected to the machine control 60 via a suitable line 63' allows the hydraulic pressure to be directed via the lines 55, 55' to the hydraulic cylinders 47, 47'. In addition, a feed back pressure transducer 66 is provided in the line 63 communicating back to the proportional air pressure controller 62 such as to assure precise air pressure regulation to the hydraulic pressure intensifier 64.

The displacement transducer sensor 58, machine control 60, air pressure controller 62, hydraulic pressure intensifier 64 and directional valve 65 thus constitute a closed loop control system connected to the deflecting means 46 in order to activate the hydraulic cylinders 47, 47' so as to move the spindle housing 25 and thus the spindle 26 such that movement of the wheelhead 39 relative to the sensor 58 is also controlled. In this respect, the signal generated by the sensor 58 is processed in the control 60 of the closed loop control system so as to have pressure applied to the proper cylinder 47, 47' to eliminate any tendency of the wheelhead 39 to deviate from a true plane perpendicular to the fixed pivot axis 23 and thus the axis of the ingot.

During operation, the housing 17 is caused to pivot by suitable means (not shown) about the axis 23 of the fixed shaft 22. Generally, the housing 17 is able to pivot over an angle of about 30°. That is, approximately ±15° relative to a horizontal plane common to the axis of rotation 23 of the shaft 22 and the axis of rotation 27 of the spindle 26.

Prior to cutting wafers from an ingot, the adjustable housing part 19 is adjusted relative to the fixed housing part 18 to ensure that the axis of rotation 27 of the spindle 26 is adjusted so as to bring the plane of saw blade 36 into a generally vertical position and into a truly perpendicular position relative to the fixed pivot axis 23 and, thus, the axis of the ingot (not shown).

Subsequently, during operation, should the wheelhead 39 and, consequently, the saw blade 36 start to deviate from a true cutting plane perpendicular to the fixed pivot axis 23, the sensor 58 will sense the deviation and make the correction to keep the blade in the true cutting plane. The sensor generates a signal for actuating the cylinders 47, 47' so as to deflect the spindle housing 25 and, thus, the spindle 26 laterally in the common plane containing the pivot axis 23 and the axis of rotation 27. In this respect, the spindle housing 25 is bending as a cantilevered beam starting at its attachment flange 28 onto the face of the pivot housing part 19 so as to correct for the deviation of the wheelhead 39 from a true cutting plane perpendicular to the fixed pivot axis 23. Of note, the clearance gap between the rear end of the spindle housing 25 and the rear bore of the pivot housing 19, e.g. a gap of 0.010 inches (250 microns), permits this lateral deviation. Further, any play which arises in the transmission belt 45 can be taken up by a suitable tensioning wheel adjustment (not shown) in the drive transmission 40.

Alternatively, a single hydraulic cylinder, either 47 or 47', may be mounted to the adjustable housing part 19 to effect the lateral movement of the spindle housing 25. In this case, the purpose is to simplify the mounting and control means with minimal compromise to desired theoretical performance.

The actuation of the deflecting means 46 is carried out automatically in response to a signal from the sensor 58 indicating a deviation of the wheelhead 39 from the established datum, i.e. gap between the sensor 58 and wheelhead 39. Further, a suitable visual display can be connected with the control 60 so as to provide a visual readout of the amount of deviation from a zero point. Likewise, a suitable means may also be provided to give a record of the position of the wheelhead 39 during cutting of one or more wafers from an ingot.

The invention thus provides a relatively simple mounting for correcting and thereby eliminating small lateral deviations of a wheelhead during a normal cutting stroke.

What is claimed is:

1. A mounting for an internal diameter saw blade comprising
    a first housing part having a bore for mounting on a stationary shaft about a first fixed axis;
    a second housing part having a bore for receiving a spindle on a second axis parallel to said first axis;
    a spindle rotatably mounted in said second housing part on said second axis and having a free end projecting from said second housing part to mount an internal diameter saw blade on said second axis;
    first means for pivotally mounting said second housing part relative to said first housing part on a pivot axis perpendicular to said first axis and said second axis; and
    second means for imposing a force on said spindle within said second housing part perpendicular to said second axis to deflect said free end thereof laterally of said second axis.

2. A mounting as set forth in claim 1 which further comprises a sensor mounted on said second housing part in facing relation to a wheelhead secured to said free end of said spindle for sensing the distance of the wheelhead from said sensor and for generating a signal in response to said distance being greater or less than a predetermined value.

3. A mounting as set forth in claim 2 which further comprises a closed loop control system connected to said sensor to receive said signal therefrom and being connected to said second means to activate said second means in response to said signal to control the wheelhead movement relative to said sensor.

4. A mounting as set forth in claim 1 wherein said second means includes a cylinder fixedly mounted in said second housing part and a piston reciprocally mounted in said cylinder for imposing said force on said spindle.

5. A mounting as set forth in claim 4 which further comprises a hydraulic line communicating with said cylinder to selectively deliver hydraulic fluid to said cylinder to bias said piston towards said spindle.

6. A mounting as set forth in claim 1 wherein said second means includes a pair of cylinders fixedly mounted on said second housing part on opposite sides of said spindle and a pair of pistons, each piston being reciprocally mounted in a respective cylinder for imposing said force on said spindle.

7. A mounting for an internal diameter saw blade comprising a housing for pivoting about a first axis and having a bore for receiving a spindle on a second axis parallel to said first axis;

a spindle rotatably mounted in said bore of said housing on said second axis and having a free end on one side of said housing for mounting of an internal diameter saw blade thereon on said second axis; and means for imposing a force on said spindle perpendicular to said second axis to deflect said free end laterally of said second axis.

8. A mounting as set forth in claim 7 which further comprises a sensor mounted on said housing in facing relation to a wheelhead secured to said free end of said spindle for sensing the distance of the wheelhead from said sensor and for generating a signal in response to said distance being greater or less than a predetermined value.

9. A mounting as set forth in claim 8 which further comprises a closed loop control system connected to said sensor to receive said signal therefrom and being connected to said means to activate said means in response to said signal to control the wheelhead movement relative to said sensor.

10. A mounting as set forth in claim 9 wherein said means includes a cylinder fixedly mounted in said housing and a piston reciprocally mounted in said cylinder for imposing said force on said cylinder.

11. A mounting as set forth in claim 10 which further comprises a hydraulic line communicating with said cylinder to selectively deliver hydraulic fluid to said cylinder to bias said piston towards said spindle.

12. A mounting as set forth in claim 7 which further comprises a drive transmission connected to said spindle for rotating said spindle about said second axis.

13. A mounting as set forth in claim 12 wherein said transmission is disposed outside said housing and said means for imposing said force is disposed inside said housing.

14. In combination,
a housing;
a spindle rotatably mounted in said housing on an axis of rotation;
an internal diameter saw blade mounted on said spindle for rotation about said axis of rotation; and
means for imposing a force on said spindle perpendicular to said axis to deflect said saw blade laterally of said axis.

15. The combination as set forth in claim 14 wherein said axis is disposed in a horizontal plane.

16. The combination as set forth in claim 14 wherein said housing is movable in a vertical plane.

17. The combination as set forth in claim 16 wherein said housing is pivotably mounted about a fixed horizontal axis.

18. The combination as set forth in claim 14 which further comprises a drive transmission connected to said spindle for rotating said spindle about said second axis.

19. The combination as set forth in claim 18 wherein said transmission is disposed outside said housing and said means for imposing said force is disposed inside said housing.

20. The combination as set forth in claim 14 which further comprises a wheelhead mounted on said spindle for mounting of said saw blade thereon and a sensor mounted on said housing in facing relation to said wheelhead for sensing the distance of said wheelhead from said sensor and for generating a signal in response to said distance being greater or less than a predetermined value.

21. The combination as set forth in claim 20 which further comprises a closed loop control system connected to said sensor to receive said signal therefrom and being connected to said means to activate said means in response to said signal to control the wheelhead movement relative to said sensor.

22. The combination as set forth in claim 14 wherein said means includes a cylinder fixedly mounted in said housing and a piston reciprocally mounted in said cylinder for imposing said force on said spindle.

23. The combination as set forth in claim 22 which further comprises a cylindrical spindle housing mounted in said housing on said axis and having said spindle rotatably mounted therein, and said piston abuts said cylindrical spindle housing for deflecting said spindle housing laterally thereat relative to and within said housing.

* * * * *

UNITED STATES PATENT AND TRADEMARK OFFICE
CERTIFICATE OF CORRECTION

PATENT NO. : 5,148,797

DATED : September 22, 1992

INVENTOR(S) : ROBERT E. STEERE, JR.

It is certified that error appears in the above-identified patent and that said Letters Patent is hereby corrected as shown below:

Column 1, Line 24 change "or" to -for-

Signed and Sealed this

Twenty-eighth Day of September, 1993

Attest:

BRUCE LEHMAN

*Attesting Officer*  *Commissioner of Patents and Trademarks*